United States Patent
Altena et al.

(10) Patent No.: US 6,327,784 B1
(45) Date of Patent: Dec. 11, 2001

(54) METHOD OF MANUFACTURING A CUTTING MEMBER HAVING AN AUXILIARY LAYER

(75) Inventors: Hermanus S. J. Altena; Maarten Brussee; Foppe Kramer; Johan Pragt, all of Drachten (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/469,879

(22) Filed: Dec. 22, 1999

(30) Foreign Application Priority Data

Dec. 24, 1998 (EP) .................................................. 98204430

(51) Int. Cl.$^7$ .......................... B26B 21/60; B26B 21/56; B23H 9/08
(52) U.S. Cl. ..................................... 30/346.54; 30/346.53; 776/104.1
(58) Field of Search ........................... 30/346.53, 346.54, 30/350, 357; 76/101.1, 104.1, DIG. 8; 205/122

(56) References Cited

U.S. PATENT DOCUMENTS

| | | | |
|---|---|---|---|
| 3,514,856 | * 6/1970 | Camp et al. | 30/346.53 |
| 3,762,243 | 10/1973 | Borrkfield | 76/104 R |
| 3,918,154 | * 11/1975 | Pagani | 30/34.2 |
| 3,977,061 | * 8/1976 | Lindstrom et al. | 30/346.54 |

FOREIGN PATENT DOCUMENTS

| | | | |
|---|---|---|---|
| 25 12 001 | * 10/1975 | (DE) | 30/350 |
| 0591339B1 | 4/1994 | (EP) . | |
| 0855256A1 | 7/1998 | (EP) . | |
| 9717158 | 5/1997 | (WO) . | |

* cited by examiner

Primary Examiner—Hwei-Siu Payer
(74) Attorney, Agent, or Firm—Ernestine C. Bartlett; Norman N. Spain (57) ABSTRACT

The invention relates to a method of manufacturing a cutting member (3). According to the method, a single side 9 of a carrier 1 of the cutting member is provided with an auxiliary layer (11). The carrier is provided with a cutting edge (7) by means of an electrochemical machining device (19), an electrode (21) of the electrochemical machining device being arranged on a side (15) of the carrier remote from the auxiliary layer. According to the invention, the auxiliary layer is provided as far as the cutting edge to be provided on the carrier, and, after the cutting edge has been provided on the carrier, the auxiliary layer is maintained on the carrier as a layer which is functional for the cutting member. In this manner, the auxiliary layer has a double function and is thus utilized in a better way. In a preferred embodiment, the auxiliary layer mainly comprises $SiO_2$ and has a thickness below 200 nm, preferably below 100 nm. In this embodiment, an edge (33) of the auxiliary layer, which is present at the location of the cutting edge of the carrier, constitutes an auxiliary cutting edge or even a main cutting edge of the cutting member, so that the cutting member has improved cutting properties and an improved service life. The cutting member is used in a shaving head (37) according to the invention and in a shaving device (35) according to the invention, which shaving device comprises a shaving head. The shaving head further comprises a manipulator (51) which is arranged near the cutting edge of the cutting member for moving hairs (75) along the cutting edge during cutting. In this manner, the auxiliary layer of the cutting member also is a protective layer protecting against wear, corrosion and providing mechanical resistance.

15 Claims, 4 Drawing Sheets

FIG. 4

METHOD OF MANUFACTURING A CUTTING MEMBER HAVING AN AUXILIARY LAYER

BACKGROUND OF THE INVENTION

The invention relates to a method of manufacturing a cutting member, according to which method the cutting member is provided with an auxiliary layer on one side and subsequently, by means of an electrochemical processing device, with at least one cutting edge, said cutting member being arranged with respect to an electrode of the electrochemical processing device in such a manner that the auxiliary layer faces away from the electrode.

The invention also relates to a cutting member provided with a plate-shaped carrier, which is provided with a cutting edge and is covered, at least near said cutting edge, with an auxiliary layer.

The invention further relates to a shaving head provided with a cutting member, which is provided with a carrier and a cutting edge for cutting hairs growing from skin, and a manipulator by means of which, in use, hairs are movable along the cutting edge of the cutting member during cutting, said cutting edge of the cutting member and the manipulator adjoining each other and being displaceable relatively to each other in a direction parallel to the cutting edge.

The invention also relates to a shaver comprising a shaving head provided with a cutting member, which is provided with a carrier and a cutting edge for cutting hairs growing from skin, and a manipulator by means of which, in use, hairs can be moved along the cutting edge of the cutting member during cutting, the cutting edge of the cutting member and the manipulator adjoining each other, and the shaver being provided with a driving device for displacing the cutting member and the manipulator of the shaving head with respect to each other in a direction parallel to the cutting edge.

A method of the type mentioned in the opening paragraphs is known from WO 97/17158. The cutting member, which can be manufactured by means of the known method, is a shaving foil which can suitably be used in an electric shaver. The auxiliary layer to be provided in accordance with the known method comprises a polymeric network which is composed of organic and inorganic fragments. After the provision of the auxiliary layer, a pattern of holes is formed in the shaving foil by means of the electrochemical processing device, the shaving foil being arranged with respect to the electrode of the electrochemical processing device in such a manner that the auxiliary layer faces away from the electrode. After the holes have been formed, the auxiliary layer is removed. Since the shaving foil is provided, on one side, with the auxiliary layer during the formation of the holes, each one of the holes thus formed has, on the above-mentioned side, an edge having a radius of rounding which is so small that the edges can be used as cutting edges for co-operation with a shearing element of the electric shaver.

A drawback of the known method resides in that the provision of the auxiliary layer on the shaving foil is rather complicated and time-consuming. Since the auxiliary layer is removed from the shaving foil after the holes have been formed in said shaving foil, the auxiliary layer is not optimally used.

SUMMARY OF THE INVENTION

It is an object of the invention to provide a method of the type mentioned in the opening paragraph, in which better use is made of the auxiliary layer.

To achieve this, the method in accordance with the invention is characterized in that the auxiliary layer is applied as far as the cutting edge to be provided on the cutting member, while, after the provision of the cutting edge, the auxiliary layer on the cutting member is preserved as a functional auxiliary layer for the cutting member. If the auxiliary layer is applied to a metal carrier of the cutting member, said auxiliary layer may serve, for example, as a corrosion-protection layer for the carrier and may be provided with a material which is suitable for this purpose. Since the auxiliary layer is applied as far as the cutting edge to be formed on the carrier of the cutting member, an edge of the auxiliary layer formed at the location of the cutting edge of the carrier may serve as an additional cutting edge or even as a main cutting edge for the cutting member and may be provided with a material which is suitable for this purpose and whose thickness is also adapted to this purpose. Since, in this manner, the auxiliary layer does not only fulfill a function during the manufacture of the cutting member, but also after the manufacture, when it is used as a functional auxiliary layer for the cutting member, better use is made of said auxiliary layer, so that the effort made to apply the auxiliary layer is better rewarded.

A particular embodiment of a method in accordance with the invention is characterized in that the auxiliary layer comprises $SiO_2$. The hardness of $SiO_2$ is greater than that of most metal and steel types. As a result, the edge of an auxiliary layer, containing predominantly $SiO_2$ and having a suitable thickness, which edge is formed at the location of the cutting edge of the carrier can, very suitably be used as a cutting edge for the cutting member. In addition, $SiO_2$ adheres very well to steel, so that an auxiliary layer which is predominantly composed of $SiO_2$ can very suitably be used in combination with a steel carrier.

A further embodiment of a method in accordance with the invention is characterized in that the auxiliary layer also comprises $ZrO_2$. By providing the auxiliary layer also with $ZrO_2$, the hardness of the auxiliary layer and hence the suitability of the edge of the auxiliary layer for use as a cutting edge for the cutting member are further improved. Since, in this further embodiment, the auxiliary layer also comprises a considerable quantity of $SiO_2$, a good adhesion of the auxiliary layer in combination with a steel carrier is ensured.

Yet another embodiment of a method in accordance with the invention is characterized in that the auxiliary layer has a thickness below 200 nm. It has been found that if the auxiliary layer is made in such a thickness and of a suitable material, such as $SiO_2$, said edge of the auxiliary layer formed at the location of the cutting edge of the carrier can suitably be used as the cutting edge of the cutting member.

A particular embodiment of a method in accordance with the invention is characterized in that the auxiliary layer has a thickness below 100 nm. At such a thickness of the auxiliary layer, the cutting properties of the edge of the auxiliary layer formed at the location of the cutting edge of the carrier are further improved.

A further embodiment of a method in accordance with the invention is characterized in that the cutting member is plate-shaped and is provided with a substantially straight cutting edge. This further embodiment of the method in accordance with the invention can particularly suitably be used to manufacture blades for use in a wet shaver. Such blades have a metal carrier having only a small thickness of, for example, 0.1 mm. Using conventional methods, the provision of a cutting edge having excellent sharpness and hardness on the carrier of such a blade is difficult, or even impossible. Since the edge of the auxiliary layer, which in accordance with the method according to the invention is formed at the location of the cutting edge of the carrier, has excellent cutting properties if the auxiliary layer is made in a suitable thickness and of a suitable material, and hence can be used as the cutting edge for the blade, the lesser cutting properties of the cutting edge formed on the carrier less determine the cutting properties of the blade, and the blade has cutting properties which are substantially determined by the cutting properties of the edge of the auxiliary layer.

Yet another embodiment of a method in accordance with the invention is characterized in that a side of the cutting member remote from the auxiliary layer is provided, by means of a mechanical material-removing device, with a first wedge-shaped part having a relatively small wedge angle, which first wedge-shaped part is situated at a distance from the cutting edge, and said side is subsequently provided, by means of the electrochemical processing device, with a second wedge-shaped part having a relatively large wedge angle, which second wedge-shaped part extends between the cutting edge and the first wedge-shaped part. Since the side of cutting member's carrier remote from the auxiliary layer is provided with both said wedge-shaped parts, the carrier provides for a rigid and stable support of the auxiliary layer near the cutting edge. The removal of material by means of the mechanical material-removing device takes place relatively rapidly relative to the removal of material by means of the electrochemical processing device. Since the electrochemical processing device is only used to form the second wedge-shaped part adjoining the cutting edge, the time necessary to manufacture the cutting member is substantially reduced, In addition, the dimensions of the second wedge-shaped part can be reduced relative to the dimensions of the first wedge-shaped part, so that the necessary manufacturing time is further reduced.

A particular embodiment of a method in accordance with the invention is characterized in that the wedge angle of the first wedge-shaped part ranges between 15° and 30°, while the wedge angle of the second wedge-shaped part ranges between 30° and 60°. As a result, the carrier of the cutting member optimally supports the auxiliary layer near the cutting edge.

A cutting member of the type mentioned in the opening paragraph is known from EP-B-0 591 339. The known cutting member is a plate-shaped blade for use in a wet shaver. The plate-shaped carrier of the known cutting member is made of steel and provided with a wedge-shaped edge portion with a cutting edge by means of a number of successive metal-removing operations. The carrier is covered on both sides with an auxiliary layer of a diamond-like carbon (DLC) having a thickness of approximately 200 nm. The auxiliary layers extend as far as the cutting edge of the carrier and, beyond said edge, merge into a tip which surrounds the cutting edge of the carrier. To strengthen said tip, the auxiliary layers are provided, near the cutting edge, over a length of approximately 250 nm with facets which include an angle of approximately 80° with each other. By using the auxiliary layers, the cutting edge of the known cutting member is protected against wear, so that the sharpness of the cutting edge and hence the service life of the cutting member are improved. By using the facets, damage to the auxiliary layers near the cutting edge is limited.

A drawback of the known cutting member is that the manufacture thereof is rather complicated and time-consuming. After the carrier of the cutting member is provided with an auxiliary layer on both sides, the auxiliary layers must subsequently be provided with said facets.

A further object of the invention is to provide a cutting member of the type mentioned in the opening paragraph, which can be manufactured in a less complicated and time-consuming manner, and the cutting properties and service life of which are comparable to those of the known cutting member.

To achieve this, the cutting member in accordance with the invention is characterized in that the auxiliary layer is applied on only one side of the carrier and extends as far as the cutting edge. Since the auxiliary layer extends as far as the cutting edge of the carrier, an edge of the auxiliary layer is present at the location of the cutting edge of the carrier. It has been found that if a suitable material is used for the auxiliary layer and the auxiliary layer is of a suitable thickness, the edge of the auxiliary layer serves as an additional cutting edge or even as a main cutting edge for the cutting member. As a result, the cutting member has cutting properties and a service life which are predominantly determined by the cutting properties and the service life of the auxiliary layer, which are comparable to the cutting properties and the service life of the known cutting member due to the use of a suitable material and a suitable thickness for the auxiliary layer. Since the cutting member in accordance with the invention is provided with an auxiliary layer on only one side, which auxiliary layer extends only as far as the cutting edge of the carrier, the cutting member in accordance with the invention is much easier to manufacture and in less time than the known cutting member.

A particular embodiment of a cutting member in accordance with the invention is characterized in that the auxiliary layer comprises $SiO_2$. The hardness of $SiO_2$ is greater than the hardness of most metal and steel types. As a result, an auxiliary layer's edge of a suitable thickness which is situated at the location of the cutting edge of the carrier and which predominantly comprises $SiO_2$ can particularly suitably be used as a durable cutting edge for the cutting member. In addition, $SiO_2$ adheres very well to steel, so that an auxiliary layer which is predominantly made of $SiO_2$ can very suitably be used in combination with a steel carrier.

A further embodiment of a cutting member in accordance with the invention is characterized in that the auxiliary layer also comprises $ZrO_2$. Since the auxiliary layer also comprises $ZrO_2$, the hardness of the auxiliary layer and hence the favorable properties of the edge of the auxiliary layer for use as a cutting edge for the cutting member are further improved. Since the auxiliary layer in this further embodiment also includes a substantial quantity of $SiO_2$, a good adhesion of the auxiliary layer in combination with a steel carrier is ensured.

Yet another embodiment of a cutting member in accordance with the invention is characterized in that the auxiliary layer has a thickness less than 200 nm. It has been found that if the auxiliary layer's edge present at the location of the cutting edge of the carrier has such a thickness and is made of a suitable material, such as $SiO_2$, said auxiliary layer's edge can suitably be used as the cutting edge of the cutting member, which cutting member exhibits excellent cutting properties and a long service life.

A particular embodiment of a cutting member in accordance with the invention is characterized in that the auxiliary layer has a thickness below 100 nm. At such a thickness of the auxiliary layer, the cutting properties of the auxiliary layer's edge present at the location of the cutting edge of the carrier are further improved.

A further embodiment of a cutting member in accordance with the invention is characterized in that a side of the cutting member facing away from the auxiliary layer is provided with a first wedge-shaped part having a relatively small wedge angle, which first wedge-shaped part is situated at a distance from the cutting edge, and with a second wedge-shaped part having a relatively large wedge angle, which second wedge-shaped part extends between the cutting edge and the first wedge-shaped part. Since the side of the cutting member's carrier facing away from the auxiliary layer is provided with both said wedge-shaped parts, the carrier provides for a rigid and stable support of the auxiliary layer near the cutting edge. As a result, deformations of the cutting edge which may develop under the influence of cutting forces acting on the cutting edge, are limited substantially, so that the service life of the cutting member is further increased and an adverse effect on the cutting properties of the cutting member by cutting forces is substantially absent.

Yet another embodiment of a cutting member in accordance with the invention is characterized in that the wedge angle of the first wedge-shaped part ranges between 15° and 30°, while the wedge angle of the second wedge-shaped part ranges between 30° and 60°. As a result, the carrier of the cutting member optimally supports the auxiliary layer near the cutting edge.

A shaving head and a shaver of the types mentioned in the opening paragraphs are known from EP-A-0 855 256. The cutting member of the known shaving head and the known shaver comprises a plate-shaped carrier provided with a straight cutting edge. The manipulator comprises a carrier which carries a comb-shaped manipulation member which is provided with a large number of teeth arranged near the cutting edge of the cutting member. In operation, hairs growing from skin penetrate the space between the teeth of the manipulation member upon moving the shaving head over the skin, whereafter said hairs reach the cutting edge of the cutting member. By means of the driving device of the shaver, the manipulator can be oscillated in a direction parallel to the cutting edge, relatively to the cutting member, so that hairs which have penetrated the space between the teeth of the manipulation member are moved to and fro along the cutting edge of the cutting member by means of the manipulator during cutting. As a result, the cutting properties of the cutting member are substantially improved and the necessary cutting forces are substantially limited.

To achieve a reliable operation of the known shaving head and the known shaver, and to preclude skin lesions, the manipulation member should be in an accurate position with respect to the cutting edge of the cutting member, the interspace between the manipulation member and the cutting edge being as small as possible. A drawback of the known shaving head and the known shaver resides in that said limited interspace brings about substantial frictional forces between the manipulation member and the cutting edge, and, as a result, the manipulation member and the cutting edge are subject to contact corrosion and frictional corrosion.

A further object of the invention is to provide a shaving head and a shaver of the types mentioned in the opening paragraphs, which do not exhibit the above-mentioned drawback of the known shaving head and the known shaver.

To achieve this, the shaving head in accordance with the invention is characterized in that the cutting member used therein is a cutting member in accordance with the invention, in which the auxiliary layer of the cutting member faces the manipulator.

To achieve said object, the shaver in accordance with the invention is characterized in that the shaving head used therein is a shaving head in accordance with the invention.

Since the cutting member of the shaving head is a cutting member in accordance with the invention, in which the auxiliary layer of the cutting member faces the manipulator, the shaving head does not only exhibit excellent cutting properties and a long service life but, if a suitable material is used, the auxiliary layer of the cutting member also serves as a protective layer against contact and frictional corrosion, while the use of the auxiliary layer also causes the frictional forces occurring between the manipulation member and the cutting edge of the cutting member to be substantially reduced.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Figure 1:
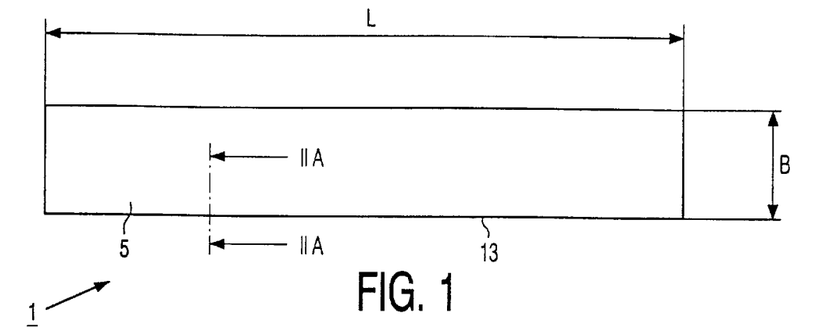
FIG. 1 shows a plate-shaped carrier from which a cutting member in accordance with the invention can be manufactured using a method in accordance with the invention.
Figure 2A:
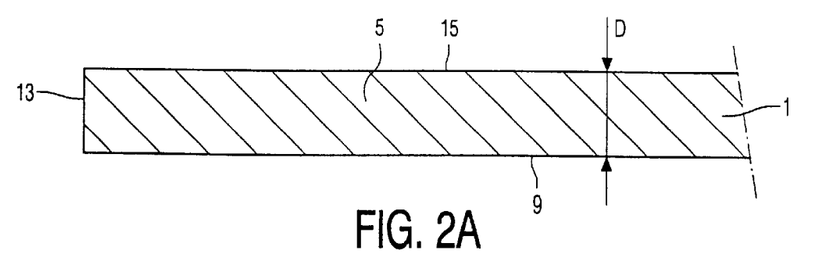
FIGS. 2a through 2e show a sectional view of the carrier taken on the line IIa—IIa in FIG. 1, after or during a number of successive steps in the method in accordance with the invention.
Figure 2B:
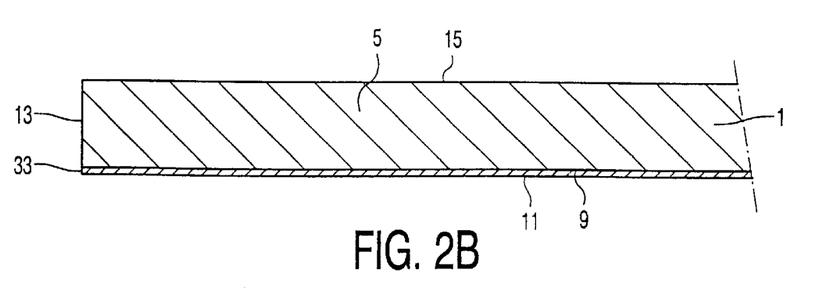
Figure 2C:
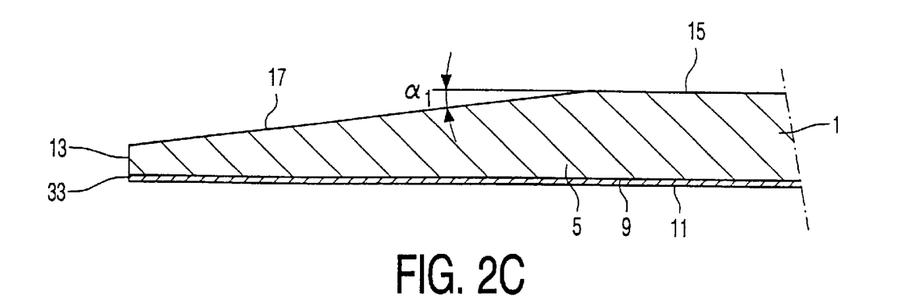
Figure 2D:
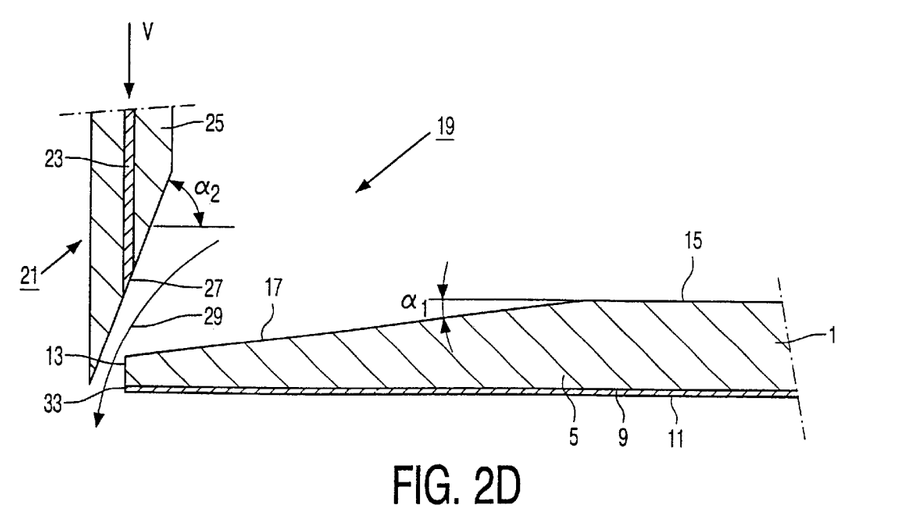
Figure 2E:
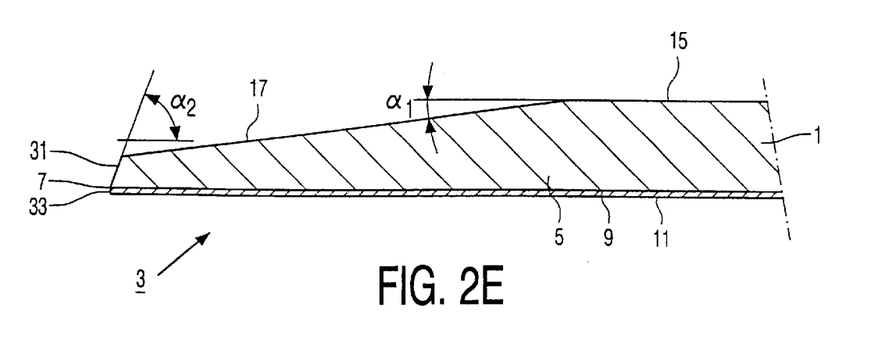

FIG. 1 shows a steel plate-shaped carrier 1 from which a cutting member 3 in accordance with the invention can be manufactured by means of a method according to the invention. FIG. 2a is a sectional view of a front part 5 of the carrier 1, on which a straight cutting edge 7 is provided by means of the method. FIG. 2e is a sectional view of the cutting member 3 with the cutting edge 7 manufactured by means of the method, the sectional view of FIG. 2e being comparable to the sectional view of FIG. 2a. The FIGS. 2b, 2c and 2d show the carrier 1, after or during a number of successive steps of the method, also in a sectional view which is comparable to the sectional view shown in FIG. 2a. In the example shown, the cutting member 3 is a plate-shaped cutting blade which can suitably be used in a wet shaver, such as the above-mentioned wet shaver disclosed in EP-B-0 591 339, or in a shaving head and shaver, which will be described hereinafter and which are in accordance with the invention. For this purpose, the carrier 1 of the example shown has a length L of a few cm, a width B of approximately 1 cm and a thickness D of approximately 0.1 mm.

As shown in FIG. 2b, the carrier 1 in accordance with the method according to the invention is first provided, on one side 9, with an auxiliary layer 11. In the example shown, the auxiliary layer 11 predominantly comprises $SiO_2$, which is applied to the carrier 1 by means of a sol-gel process. Sol-gel processes are generally known and customarily used to apply ceramic layers. In accordance with this process, a solvent, which in the example shown comprises alcohol, and in which an Si compound is dissolved, which in the example shown includes tetra-ethyl-orthosilicate (TEOS), is applied to the carrier 1 by means of, for example, a spinning, spraying or casting process. During evaporation of the solvent, a chemical reaction takes place in which $SiO_2$ is formed which remains in the form of a layer on the carrier 1. The carrier 1 is subsequently placed in a furnace for some time, thereby causing solvent residue to evaporate from the layer of $SiO_2$ and polymerization of $SiO_2$. Since $SiO_2$ adheres very well to steel, $SiO_2$ can very suitably be used in combination with the steel carrier 1. The applied auxiliary layer 11 has a thickness below 200 nm and is applied, as shown in FIG. 2b, as far as an edge 13 of the carrier 1, at which location the cutting edge 7 is to be formed. The auxiliary layer 11 can be applied such that it covers the entire side 9 of the carrier 1. In the example shown, however, the auxiliary layer 11 is predominantly applied to the front part 5 of the carrier 1.

As shown in FIG. 2c, after applying the auxiliary layer 11, the front part 5 of the carrier 1 is provided, in accordance with the method, on a side 15 facing away from the auxiliary layer 11, with a first wedge-shaped part 17 having a relatively small wedge angle $\alpha_1$. In the example shown, the first wedge-shaped part 17 is provided by means of a mechanical material-removing device, such as a grinding machine which is known per se and customarily used, and extends, in FIG. 2c, as far as the edge 13 of the carrier 1. As shown in FIG. 2e, the first wedge-shaped part 17 is situated on the eventual cutting member 3 at some distance from the cutting edge 7.

In accordance with the method, the carrier 1 is subsequently provided with the above-mentioned cutting edge 7 near the edge 13. For this purpose, use is made of an electrochemical processing device 19, which is only diagrammatically shown in FIG. 2d, and which is provided with an electrode 21. In the example shown, the electrode 21 comprises a copper core 23 and a cladding 25 which is made from an electrical insulator. The electrode 21 has a wedge-shaped end portion 27 which is provided with a relatively large wedge angle $\alpha_2$. As shown in FIG. 2d, the electrode 21 is arranged above the edge 13 of the carrier 1, and the carrier 1 is arranged in such a manner with respect to the electrode 21 that the auxiliary layer 11 faces away from the electrode 21. The electrode 21 and the carrier 1 are in a highly ionic electrolytic solution, such as a $NaNO_3$ solution. An electric voltage is applied between the electrode 21 and the carrier 1, the electrode 21 serving as the cathode and the carrier 1 as the anode. The applied voltage ranges, for example, from 10 to 20 V. By means of the arrow 29 in FIG. 2d, a flow of the electrolytic solution is indicated, which flow is maintained between the carrier 1 and the electrode 21 in the course of the electrochemical machining process. The flow 29 is guided by means of the cladding 25 of the electrode 21, said cladding 25 also precluding too wide a spread of the electric current from the electrode 21 to the carrier 1.

In the course of the electrochemical machining process, the carrier 1 is provided, near the edge 13, with a second wedge-shaped part 31 on the side 15 facing away from the auxiliary layer 11, said second wedge-shaped part being shown in FIG. 2e and extending between the cutting edge 7 and the first wedge-shaped part 17. The electrode 21 is in a fixed position with respect to the carrier 1. The electrode 21 may alternatively be moved towards the carrier 1 at a rate of feed indicated by means of an arrow V in FIG. 2d. The shape of the second wedge-shaped part 31 thus provided corresponds to a shape of the electrode 21 and therefore has a relatively large wedge angle $\alpha_2$ which corresponds to the wedge angle of the electrode 21. The electrochemical machining process is continued until the second wedge-shaped part 31 formed connects to an edge 33 of the auxiliary layer 11. As a result, the cutting edge 7 of the carrier 1 is formed at the location of the edge 33 of the auxiliary layer 11 as a boundary of the second wedge-shaped part 31, a very high dimensional accuracy of the second wedge-shaped part 31 being attained. By using the auxiliary layer 11, which is inert to the electrochemical machining process, it is precluded that the second wedge-shaped part 31 is rounded near the edge 33 of the auxiliary layer 11 by the electrochemical machining process, so that the cutting edge 7 of the carrier 1 formed at the location of the edge 33 of the auxiliary layer 11 has only a very small radius of rounding and hence is very sharp.

In accordance with the method according to the invention, after the electrochemical machining process, the auxiliary layer 11, as shown in FIG. 2e, is maintained on the carrier 1 as a functional auxiliary layer for the cutting member 3. In the example shown in FIG. 2e, where the auxiliary layer 11 comprises predominantly $SiO_2$, said auxiliary layer has a thickness below 200 nm and extends as far as the cutting edge 7 of the carrier 1, the edge 33 of the auxiliary layer 11 present at the location of the cutting edge 7 of the carrier 1 serving as an additional cutting edge or even as a main cutting edge for the cutting member 3. Since the hardness of $SiO_2$ is much greater than the hardness of most metal and steel types, the edge 33 of the auxiliary layer 11 has a high resistance to wear, so that the cutting member 3 has a long service life. In an alternative embodiment, the auxiliary layer 11 comprises a mixture of predominantly $SiO_2$ and $ZrO_2$. The hardness and the resistance to wear of the edge 33 of the auxiliary layer 11, and hence the service life of the cutting member 3, are further increased thereby, while the presence of $SiO_2$ in the above-mentioned mixture provides for a good adhesion of the auxiliary layer 11 to the steel carrier 1. Such an auxiliary layer of $SiO_2$ and $ZrO_2$ can be formed, for example, by adding, apart from the above-mentioned tetra-ethyl-orthosilicate (TEOS), for example tetra-butoxy-zirconate (TBOZ) to the solvent solution during the sol-gel process, so that, apart from $SiO_2$, $ZrO_2$ is formed during the evaporation of the solvent solution. However, the invention also comprises embodiments in which the auxiliary layer 11 predominantly comprises $ZrO_2$, so that a very great hardness and resistance to wear of the edge 33 of the auxiliary layer 11 are obtained, or embodiments in which the auxiliary layer 11 comprises, for example, a different type of ceramic material, such as $Cr_2O_3$, as a result of which also a very high hardness and resistance to wear of the auxiliary layer 11 are achieved. It has been found that the edge 33 of the auxiliary layer 11 has good cutting properties if the thickness of the auxiliary layer 11 is smaller than approximately 200 nm. A substantial improvement of the cutting properties of the edge 33 is achieved if the auxiliary layer 11 has a thickness of 100 nm or less. Such a thickness of the auxiliary layer 11 can be achieved by means of a sol-gel process without intolerable variations in thickness. Since the auxiliary layer 11 does not only fulfill a function during the manufacture of the cutting member 3, i.e. preventing too large a radius of rounding of the cutting edge 7 of the carrier 1, but is also used, after the manufacture of the cutting member 3, as a functional auxiliary layer 11 whose edge 33 serves as an additional cutting edge, or even main cutting edge, of the cutting member 3, better use is made of the auxiliary layer 11, and the cutting properties and the service life of the cutting member 3 are improved substantially.

Since the carrier 1 is provided on the side 15 facing away from the auxiliary layer 11, not only with the first wedge-shaped part 17 having the relatively small wedge angle $\alpha_1$, but also, near the cutting edge 7, with the second wedge-shaped part 31 having the relatively large wedge angle $\alpha_2$, the carrier 1 has an average thickness, near the cutting edge 7, which substantially exceeds a thickness of the carrier if said carrier would be provided, as is customary with cutting members, particularly cutting blades, with a single wedge-shaped part having a relatively small wedge angle and extending as far as the cutting edge. As a result, the carrier 1 provides for a rigid and stable support of the auxiliary layer 11 near the cutting edge 7, and deformations of the carrier 1, which could develop near the cutting edge 7 as a result of cutting forces, and which lead to fracture in the auxiliary layer 11, are precluded as much as possible. At a customary value of the wedge angle $\alpha_1$ in the range between approximately 15° and approximately 30°, an optimum support of the auxiliary layer 11 is obtained, and the cutting properties of the cutting edge 7 and the edge 33 of the auxiliary layer 11 are substantially uninfluenced if the wedge angle $\alpha_2$ ranges between approximately 30° and approximately 60°. As, in the above-discussed example of the method in accordance with the invention, the first wedge-shaped part 17 of the carrier 1 is provided by means of a mechanical material-removing device, and the relatively slow electrochemical machining process is employed only for providing the second wedge-shaped part 31 which is relatively small with respect to the first wedge-shaped part 17, the time necessary to manufacture the cutting member 3 is substantially reduced. The invention also comprises embodiments of the method, in which also the first wedge-shaped part 17 is provided by means of an electrochemical machining process, or in which the carrier 1 is only provided, by means of an electrochemical machining process, with a single wedge-shaped part having a relatively small wedge angle and extending as far as the cutting edge 7. However, such embodiments lead to an inefficient application of the relatively slow electrochemical machining process, because, in this case, the electrochemical machining process is also used at a distance from the cutting edge 7 where high dimensional accuracies and/or small radii of rounding of the carrier 1 are not required. The invention also includes embodiments of the method in which the first wedge-shaped part 17 is provided by means of a different type of mechanical machining process which is relatively fast compared to an electrochemical machining process. An example of such a mechanical machining process is a plastic deformation process, such as a rolling process.

As described hereinabove, a method in accordance with the invention can particularly suitably be used to manufacture a cutting member in accordance with the invention, such as the above-described cutting member 3. A cutting member in accordance with the invention can also be manufactured, however, by means of methods other than a method in accordance with the invention. For example, the cutting edge 7 of the carrier 1 of the cutting member 3 in accordance with the invention can be provided, for example, by means of a chemical etch process or by means of a mechanical material-removing process instead of the above-described electrochemical machining process. Furthermore, the auxiliary layer 11 of the cutting member 3 in accordance with the invention can be provided, for example, by means of a sputter process instead of the above-described sol-gel process. Since a cutting member in accordance with the invention is provided, on only one side, with an auxiliary layer which extends only as far as the cutting edge of the carrier of the cutting member, a cutting member in accordance with the invention can be manufactured in a relatively simple manner and in a relatively short period of time.

A method in accordance with the invention can also suitably be used to manufacture types of cutting members other than a cutting member in accordance with the invention. Examples of such cutting members are cutting members provided with a carrier other than a plate-shaped carrier, such as a wedge-shaped carrier, or provided with more than one cutting edge, or with cutting edges of a different shape, for example a round or oval shape. Examples hereof include shaving foils having a pattern of holes which are each provided with a cutting edge.

Figure 3:
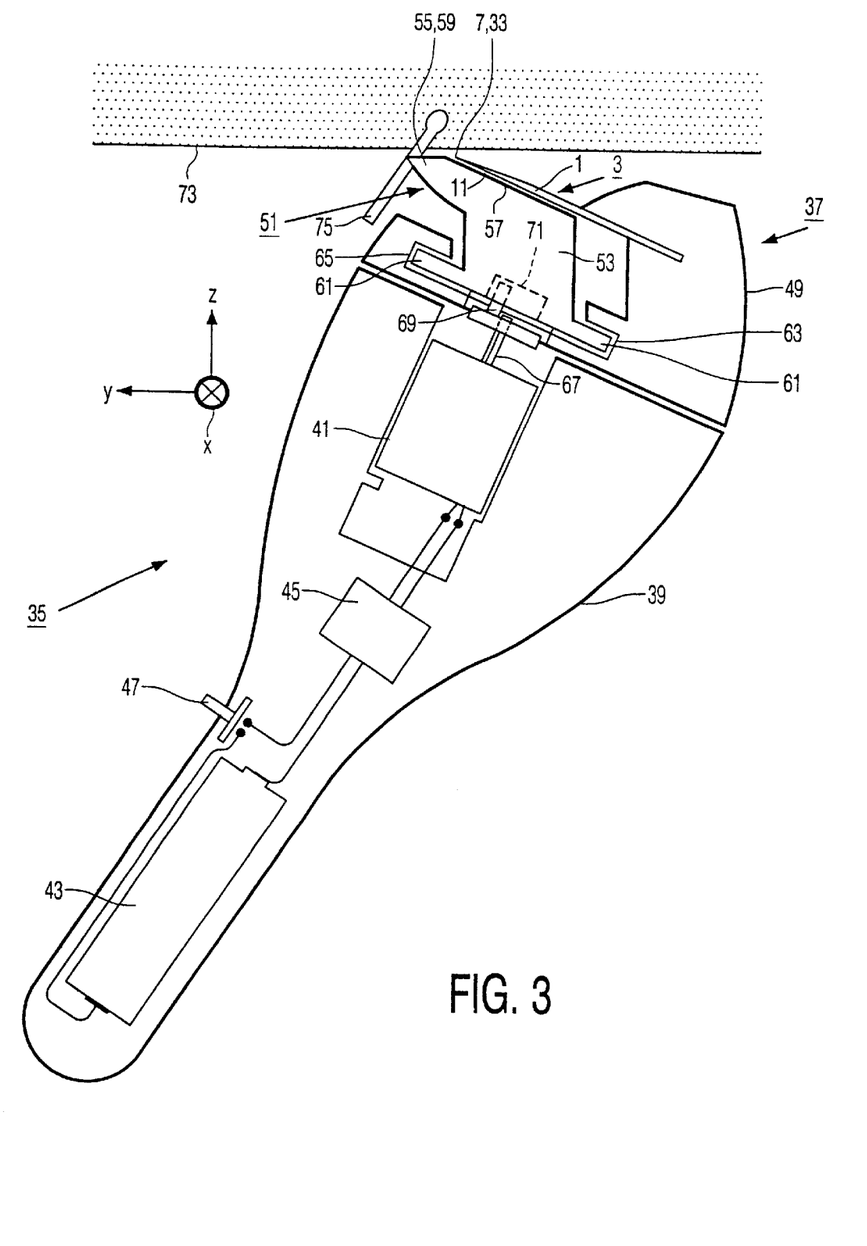
FIG. 3 shows a shaver in accordance with the invention, which is provided with a shaving head in accordance with the invention.
Figure 4:
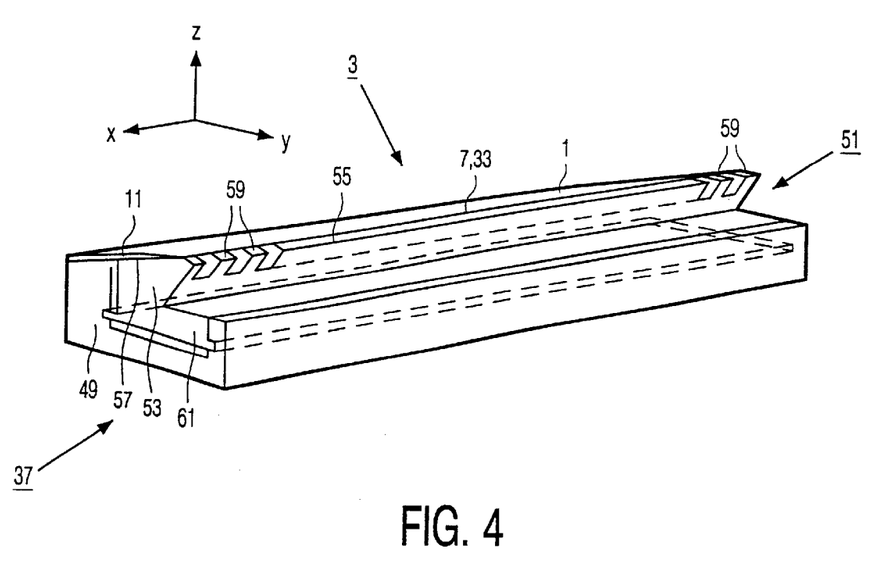
FIG. 4 is a sectional view of the shaver shown in FIG. 3

FIGS. 3 and 4 show, respectively, a shaver 35 in accordance with the invention and a shaving head 37 in accordance with the invention which forms part of the shaver 35. The shaver 35 includes a housing 39 on which the shaving head 37 is detachably secured by means of securing means which are not shown in FIGS. 3 and 4 for simplicity's sake. The housing 39 accommodates an electric motor 41, a battery 43 for feeding the motor 41, and an electric regulator 45 for controlling the motor 41. The motor 41 can be switched on and off by means of a switch 47 provided on the housing 39.

The shaving head 37 comprises a cutting member in accordance with the invention, such as the above-described cutting member 3, which is provided with the plate-shaped carrier 1 and the cutting edge 7. The cutting member 3 is secured, in a fixed position, to a holder 49 of the shaving head 37, the cutting edge 7 extending parallel to an X-direction which extends perpendicularly to a shaving direction Y of the shaver 35. The shaving head 37 further includes a manipulator 51 which is provided with a carrier 53 and a comb-shaped manipulation member 55. The carrier 53 has a flat boundary surface 57 which is adjacent to the carrier 1 of the cutting member 3. The comb-shaped manipulation member 55 comprises a row of teeth 59, which are arranged parallel to the X-direction and extend substantially throughout the width of the manipulation member 55 and, viewed in the shaving direction Y, are arranged directly in front of the cutting edge 7 of the cutting member 3. It is noted that, for the sake of simplicity, only a few teeth 59 of the manipulation member 55 are shown in FIG. 4. Viewed in a direction parallel to the X-direction, the carrier 53 of the manipulator 51 can be displaced relatively to the holder 49 of the shaving head 37 and, for this purpose, is provided with a guide 61 which extends parallel to the X-direction and serves to co-operate with two grooves 63, 65 which are provided in the holder 49 of the shaving head 37 and also extend in a direction parallel to the X-direction. An eccentrically arranged pin 69 for co-operation with a groove 71 provided in the carrier 53 of the manipulator 51 is provided on an output shaft 67 of the motor 41. Viewed in a direction parallel to the X-direction, the groove 71 has a width which corresponds to a diameter of the pin 69, so that a rotation of the output shaft 67 of the motor 41 is converted to an oscillating movement of the manipulator 51 with respect to the holder 49 of the shaving head 37, in a direction parallel to the X-direction.

In use, the shaving head 37 of the shaver 35 should be moved by the user over a skin 73 to be shaved in the shaving direction Y. As a result, hairs 75 growing from the skin 73 first penetrate into spaces between the teeth 59 of the manipulation member 55, whereafter said hairs 75 reach the cutting edge 7 of the cutting member 3. As a result of the fact that the manipulator 51 carries out an oscillating movement with respect to the cutting edge 7 in a direction parallel to the X-direction, the hairs 75, viewed in a direction parallel to the X-direction, are moved to and fro along the cutting edge 7 by the manipulator 51 just before and during the cutting operation. As a result, the cutting properties of the cutting member 3 are substantially improved and the necessary cutting forces are substantially reduced.

To obtain a reliable operation of the shaving head 37 and the shaver 35, and, in particular, to preclude skin lesions, the manipulation member 55 should be in an accurate position with respect to the cutting edge 7 of the cutting member 3, an interspace between the manipulation member 55 and the cutting edge 7 being as small as possible or even absent. In accordance with the invention, the cutting member 3 is secured in the holder 49 of the shaving head 37 in such a manner that the auxiliary layer 11 of the cutting member 3 faces the manipulator 51. As a result, in the shaver 35 and the shaving head 37, not only the particular cutting properties provided by the edge 33 of the auxiliary layer 11, and the service life of the cutting member 3 become manifest, but the auxiliary layer 11 is also responsible for a substantial reduction of the frictional forces occurring between the manipulation member 55 and the cutting edge 7. The auxiliary layer 11 also serves as a protective layer against frictional corrosion and contact corrosion, which may occur if the carrier 1 of the cutting member 3 and the carrier 53 of the manipulator 51 are made from different materials.

In the above-described cutting member 3 in accordance with the invention, the edge 33 of the auxiliary layer 11 maintained on the cutting member 3 after the manufacture of said cutting member 3 serves as an additional cutting edge or even as a main cutting edge of the cutting member. For this purpose, the auxiliary layer 11 comprises substantially $SiO_2$ or a mixture of substantially $SiO_2$ and $ZrO_2$, the thickness of the auxiliary layer 11 being less than 200 nm, preferably less than 100 nm. In the above-described shaving head 37 in accordance with the invention, the auxiliary layer 11 additionally serves as a protective layer against frictional and contact corrosion, and as a friction-reducing layer. It is noted that the invention also includes methods and cutting members, in which, dependent upon the function of the auxiliary layer on the cutting member, the applied auxiliary layer is made of another material and/or has a different thickness. If the auxiliary layer is only used, for example, to reduce friction or to protect against corrosion, the auxiliary layer may have, for example, a much greater thickness than 200 nm and be made, for example, from a type of material having a much lower hardness.

What is claimed is:

1. A method of manufacturing a cutting member comprising the steps:

providing an auxiliary layer on one side of a cutting member, then providing said cutting member with a cutting edge by means of an electrochemical processing device, said cutting member being arranged in such a manner with respect to an electrode of the electrochemical processing device that the auxiliary layer faces away from the electrode, said auxiliary layer being applied as far as the cutting edge to be provided on the cutting member and being preserved, after provision of the cutting edge, as a functional auxiliary layer for said cutting member, providing a side of said cutting member, remote from the auxiliary layer, with a first wedge-shaped part having a relatively small wedge angle, by means of a mechanical material-removing device, said first wedge-shaped part situated at a distance from the cutting edge, then, providing said side, remote from the auxiliary layer, with a second wedge-shaped part having a relatively large wedge angle, said second wedge shaped part extending between the cutting edge and said first wedge-shaped part and being formed by means of the electrochemical processing device.

2. A method as claimed in claim 1, characterized in that the auxiliary layer comprises $SiO_2$.

3. A method as claimed in claim 2, characterized in that the auxiliary layer also comprises $ZrO_2$.

4. A method as claimed in claim 1, characterized in that the auxiliary layer has a thickness below 200 nm.

5. A method as claimed in claim 4, characterized in that the auxiliary layer has a thickness below 100 nm.

6. A method as claimed in claim 1, characterized in that the cutting member is plate-shaped and is provided with a substantially straight cutting edge.

7. A method as claimed in claim 6, characterized in that the wedge angle of the first wedge-shaped part ranges between 15° and 30°, while the wedge angle of the second wedge-shaped part ranges between 30° and 60°.

8. A cutting member comprising a plate-shaped carrier provided with a cutting edge, said carrier provided, only on one side, with an auxiliary layer, said auxiliary layer extending as far as the cutting edge, a side of the cutting edge facing away from said auxiliary layer provided with a first wedge-shaped part, having a relatively small wedge angle and situated at a distance from the cutting edge and with a second wedge-shaped part having a relatively large wedge angle and extending between the cutting edge and the first wedge-shaped part.

9. A cutting member as claimed in claim 8, characterized in that the auxiliary layer comprises $SiO_2$.

10. A cutting member as claimed in claim 9, characterized in that the auxiliary layer also comprises $ZrO_2$.

11. A cutting member as claimed in claim 8, characterized in that the auxiliary layer has a thickness less than 200 nm.

12. A cutting member as claimed in claim 11, characterized in that the auxiliary layer has a thickness below 100 nm.

13. A cutting member as claimed in claim 8, characterized in that the wedge angle of the first wedge-shaped part ranges between 15° and 30°, while the wedge angle of the second wedge-shaped part ranges between 30° and 60°.

14. A shaving head comprising a cutting member, which is provided with a carrier and a cutting edge for cutting hairs growing from skin, and a manipulator by means of which, in use, hairs can be moved along the cutting edge of the cutting member during cutting, the cutting edge of the cutting member and the manipulator adjoining each other and being displaceable relatively to each other in a direction parallel to the cutting edge, characterized in that the cutting member is a cutting member as claimed in claim 8, the auxiliary layer of the cutting member facing the manipulator.

15. A shaver comprising a shaving head provided with a cutting member, which is provided with a carrier and a cutting edge for cutting hairs growing from skin, and a manipulator by means of which, in use, hairs can be moved along the cutting edge of the cutting member during cutting, the cutting edge of the cutting member and the manipulator adjoining each other, and the shaver being provided with a driving device for displacing the cutting member and the manipulator of the shaving head with respect to each other in a direction parallel to the cutting edge, characterized in that the shaving head is a shaving head as claimed in claim 14.

* * * * *